United States Patent
Girard, Peter F.

[15] 3,703,998
[45] Nov. 28, 1972

[54] DRONE AIRCRAFT WITH TELESCOPIC FUSELAGE

[72] Inventor: Peter F. Girard, La Mesa, Calif.

[73] Assignee: Teledyne Ryan Aeronautical Company, San Diego, Calif.

[22] Filed: Dec. 28, 1970

[21] Appl. No.: 101,558

[52] U.S. Cl. ............. 244/13, 244/2, 244/135 B
[51] Int. Cl. ................. B64c 1/28, B64c 3/56
[58] Field of Search .......... 244/13, 137, 118, 135 B, 244/135 A, 135 C, 2, 138, 42 DB, 3.26, 3.28; 102/4, 6, 49.7, 67

[56] References Cited

UNITED STATES PATENTS

| | | | |
|---|---|---|---|
| 2,876,677 | 3/1959 | Clark et al. | 244/2 |
| 3,005,406 | 10/1961 | Ronfeldt | 102/6 |
| 3,494,284 | 2/1970 | Gross | 102/67 |
| 2,755,046 | 7/1956 | Underwood | 244/135 C |
| 3,021,855 | 2/1962 | Cartwright et al. | 244/135 C |
| 3,136,507 | 6/1964 | Erlanger et al. | 244/135 B |
| 2,620,147 | 12/1952 | Butler et al. | 244/42 DB |

Primary Examiner—George E. A. Halvosa
Assistant Examiner—Stephen G. Kunin
Attorney—Carl R. Brown, Stephen L. King and Kenneth W. Mateer

[57] ABSTRACT

A drone type aircraft having a telescopic fuselage and folding aerodynamic surfaces to facilitate installation in a limited capacity bomb bay or storage compartment of a launch aircraft. Prior to launch, the drone is lowered from the aircraft on a supporting frame, the aerodynamic surfaces are extended, and the nose section of the fuselage is extended. The added fuselage capacity is used as fuel tankage, which is filled from the launch aircraft to increase the operating range of the drone.

5 Claims, 6 Drawing Figures

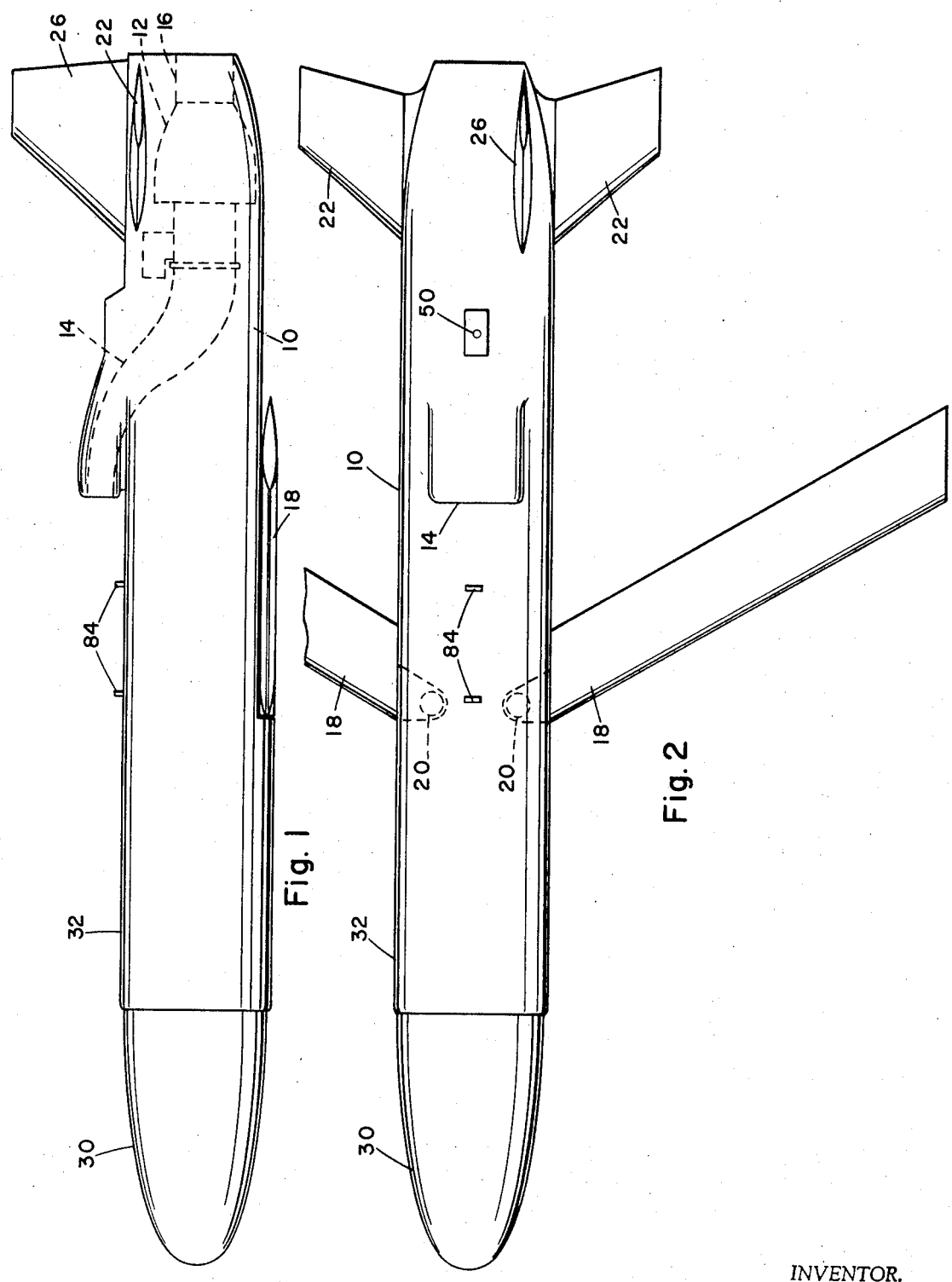

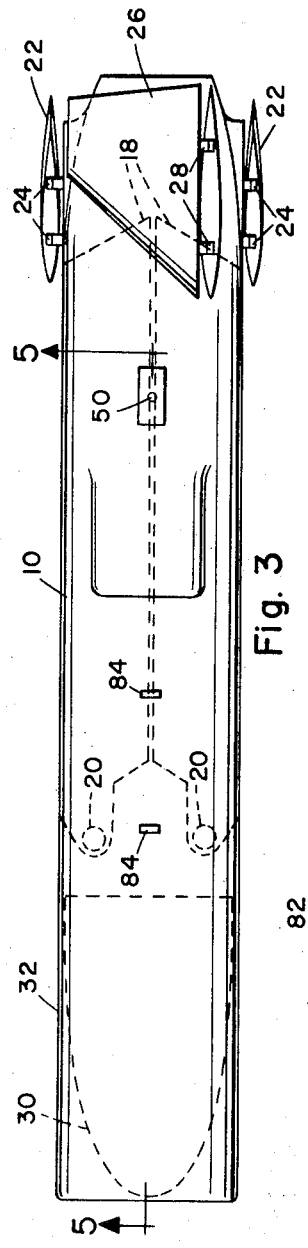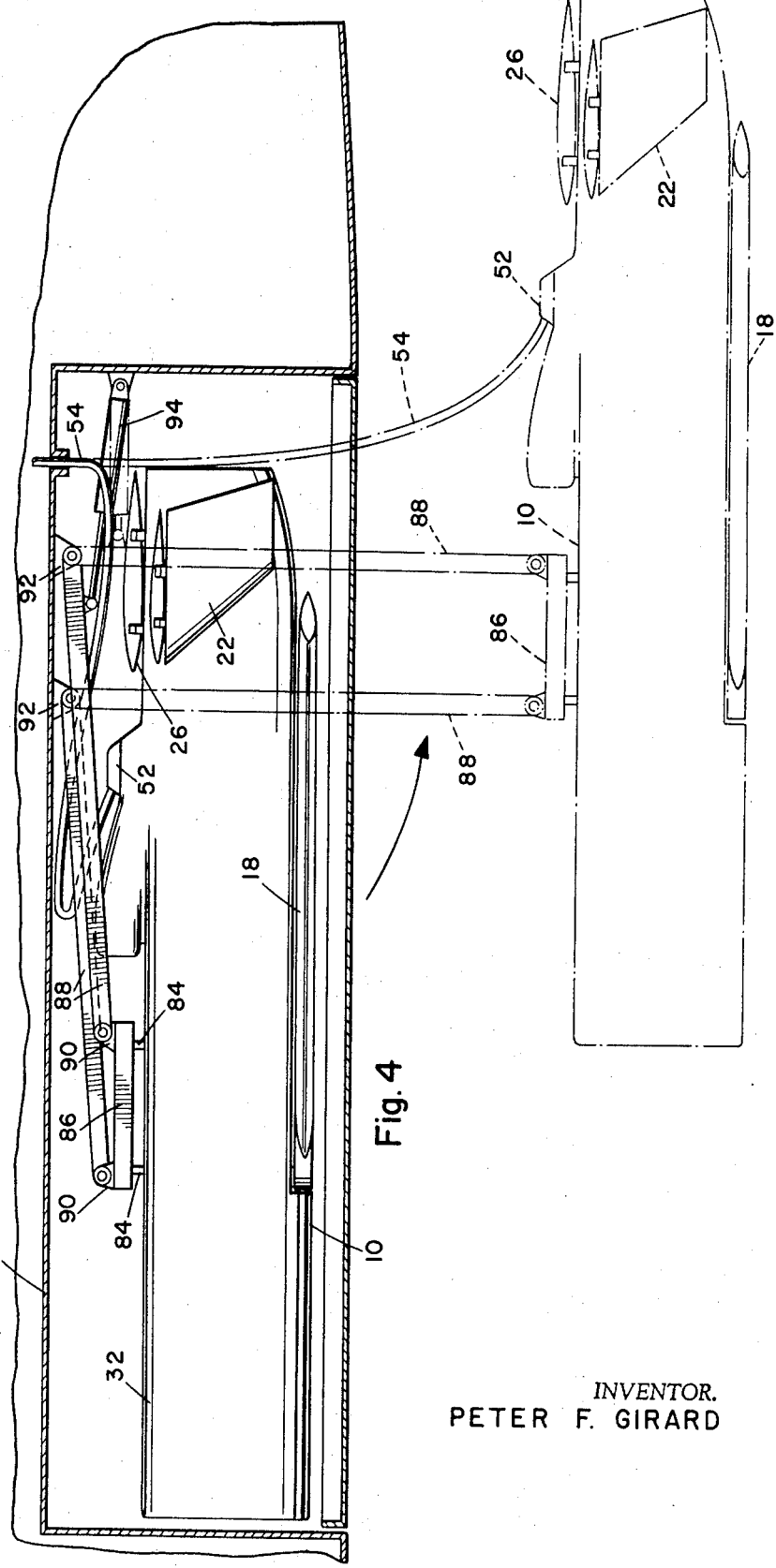

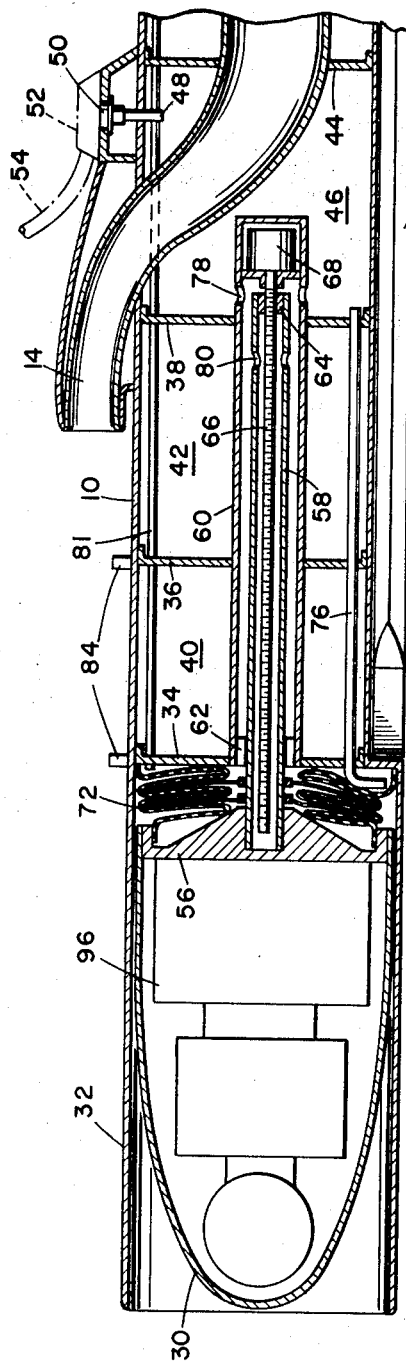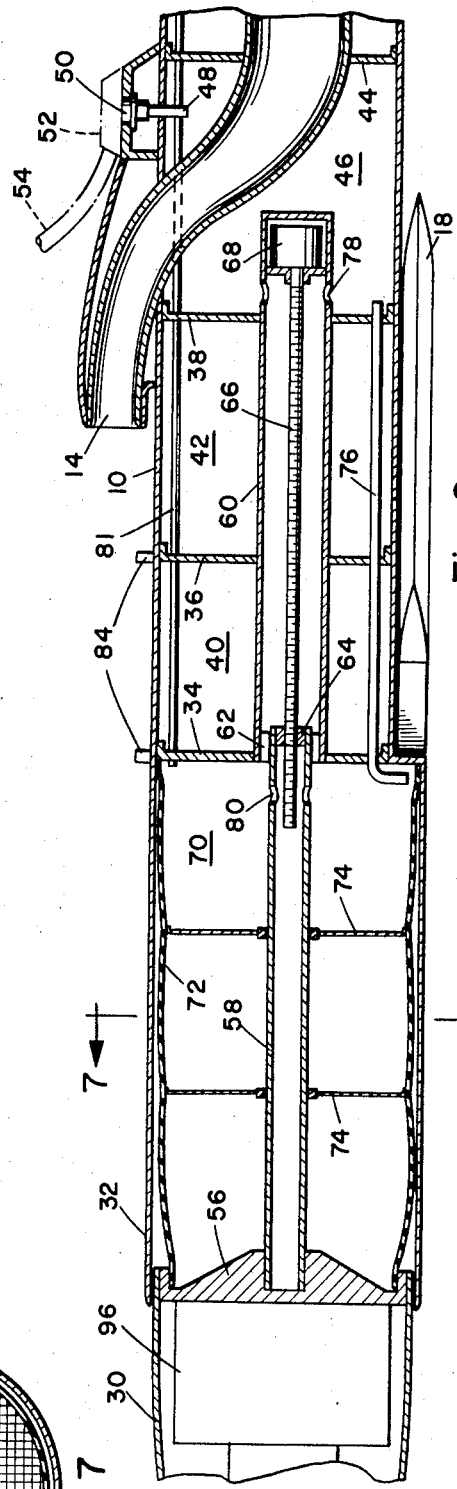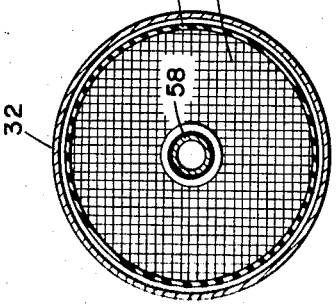

DRONE AIRCRAFT WITH TELESCOPIC FUSELAGE

BACKGROUND OF THE INVENTION

Remotely controlled or drone aircraft have been carried by launch aircraft and released near the required zone of operation. To reduce complexity and cost, such drones are usually small and have limited range. When a drone is carried externally on a launch aircraft, size is not critical, but in high performance aircraft in which the drone must be stowed internally, there is a necessary compromise between size and fuel capacity. Folding fins and other aerodynamic surfaces are well known in aircraft and missiles for minimizing size in stored condition, but the bulk and capacity of the body or fuselage is the factor which limits the range and useful life of the drone.

SUMMARY OF THE INVENTION

The drone aircraft described herein has foldable aerodynamic surfaces to minimize overall size in storage, and the significant feature is a telescopic nose portion incorporated in the fuselage to reduce the length considerably when retracted. With all elements folded or retracted, the drone will fit into a bomb bay or other storage compartment of reasonable size, and is supported by hinged arm structure. For launching, the drone is lowered on the arms to a position below the launch aircraft and the aerodynamic surfaces are extended. The telescopic nose portion is then extended and the vacated portion of the fuselage becomes a fuel tank, with a fuel retaining bladder lining which unfolds as the nose extends. Fuel is pumped into the added tank space from the launch aircraft and the drone is ready for flight, with greatly increased range capability. The added tank space near the nose is connected to aft tank space in the basic drone structure, so that the center of gravity of the drone does not shift appreciably as fuel is consumed. Various types of drones are adaptable to the arrangement, the structure being simple and the associated actuating means being contained in the drone.

The primary object of this invention, therefore, is to provide a new and useful drone aircraft with a telescopic fuselage.

Another object of this invention is to provide a drone aircraft having a telescopic nose portion and folding aerodynamic surfaces, enabling the drone to be carried in a small bomb bay or compartment of a launch aircraft.

Another object of this invention is to provide a drone aircraft in which the telescopic nose portion extends to form a fuel tank, which is filled from the launch aircraft immediately prior to launching the drone.

Other objects and many advantages of this invention will become more apparent upon a reading of the following detailed description and an examination of the drawings wherein like reference numerals designate like parts in which:

FIG. 1 is a side elevation view of a typical drone aircraft in flight condition.

FIG. 2 is a top plan view thereof.

FIG. 3 is a top plan view of the drone with the nose retracted and aerodynamic surfaces folded.

FIG. 4 is a side elevation view of the drone in an aircraft bomb bay, shown in section, and showing the supporting arm action.

FIG. 5 is an enlarged sectional view taken on line 5—5 of FIG. 3.

FIG. 6 is a similar sectional view, but with the nose extended.

DESCRIPTION OF THE PREFERRED EMBODIMENT

The drone aircraft shown is an example, the specific configuration and the arrangement of the aerodynamic components being variable to suit particular uses and performance requirements. The drone comprises a generally cylindrical fuselage 10, in the rear of which is a turbojet propulsion engine 12 with an air intake duct 14 and a rearwardly opening tailpipe 16. Wings 18 are mounted below the fuselage and swing about hinges 20 to fold under the fuselage in side by side relation. On the rear portion of the fuselage are horizontal stabilizer surfaces 22, mounted on hinges 24 to fold downwardly at the sides of the fuselage. On top is a fin 26 attached by hinges 28 to fold downwardly across the top of the fuselage. Any suitable actuating means such as springs or powered devices may be used to extend the aerodynamic components when required. Also, any suitable arrangement of control surfaces and actuating means may be used, various systems being well known.

The streamlined nose 30 is longitudinally slidable in the forward portion 32 of fuselage 10 and is fully extended forwardly in normal flight. Inside the fuselage are a forward bulkhead 34 and two rearwardly spaced bulkheads 36 and 38 enclosed equipment bays 40 and 42. Between bulkhead 38 and a further rear bulkhead 44 is an aft fuel tank 46. On top of the fuselage is a filler neck 48 leading into tank 46, the filler neck having an external connector 50 for attachment of a conventional filler head 52 on an umbilical fuel hose 54.

The rear end of nose 30 is closed by a bulkhead 56 suitably reinforced to support the nose on an axially rearwardly extending support tube 58, which is slidable in a sleeve 60 fixed axially through bulkheads 34, 36 and 38. At bulkhead 34 the tube 58 slides in a bearing 62, the rear end of the tube containing a nut collar 64 which runs on a threaded rod 66 extending axially within the tube. The threaded rod 66 is rotatably driven by a motor 68, sealed in the rear end of sleeve 60, to provide a screw jack action for extending the nose longitudinally, as in FIG. 6. In the stowed position, shown in FIG. 5, the nose is completely retracted into forward portion 32. As the nose 30 is extended, the interior of the forward portion 32 becomes a large compartment, which is made into a forward fuel tank 70 by means of a flexible bladder 72. The bladder, of suitable fuel impervious material, is a tubular element with the ends secured peripherally to the nose bulkhead 56 and forward bulkhead 34. In stowed condition the bladder 72 is accordion folded, as in FIG. 5 and is pulled open by motion of the nose. Porous baffles 74, sliding along tube 58 provide interior support to the extended bladder. The front and rear fuel tanks 70 and 46 are connected at their lower portions by a transfer pipe 76 to maintain a balance of fuel, which is supplied through filler neck 48. Ports 78 in the sleeve 60 in the rear fuel tank section allow fuel to pass along the sleeve and through openings in the bearing 62 to the forward fuel tank, in addition to the transfer pipe, thus accelerating the filling operation. Ports 80 in the tube 58 permit the interior of the tube to be used as additional tank space. To ensure proper filling and subsequent removal of the fuel, a vent pipe 81 extends from forward fuel bank 70 to a suitable high point on the drone, such as at the top of the extended fin 26.

The drone is normally carried in an aircraft bomb bay 82, or similar compartment, shown in section in FIG. 4. Lugs 84 are provided on top of fuselage 10 for attachment to a shackle or cradle 86, in the manner of a conventional bomb or store. The drone is suspended on parallel arms 88 pivotally connected between brackets 90 on the cradle 86 and brackets 92 in the bomb bay 82. An actuator 94 holds the arms 88 in the upper or folded position with the drone stowed inside the bomb bay, as in the full line position in FIG. 4. Immediately prior to launch, the actuator lowers the arms to hold the drone below and clear of the aircraft, as in the broken line position. The payload 96, indicated in nose 30, can be a warhead or any particular equipment for a required operation.

In a typical mission the drone is carried to the vicinity of its destination in the bomb bay of the launch aircraft. For launching the drone is lowered below the aircraft and the nose 30 is extended. Fuel is then pumped from a source, not shown, in the launch aircraft, through hose 54 and filler head 52, to fill the drone's tanks to the required level, then the filler head is disconnected. The wings and tail surfaces are then extended and engine 12 is started. When all equipment is functioning properly, the drone is released from cradle 86 and begins free flight. Normally some type of conventional guidance or remote control means will be used to guide the drone during flight, over the extended range made possible by the additional fuel.

Having described my invention, I now claim.

1. A drone aircraft having a fuselage, with aerodynamic lifting and control surfaces thereon;

said fuselage having a nose portion telescopically movable between a retracted position within the fuselage and an extended position forming the nose of the fuselage;

drive means mounted in said fuselage and connected to said nose portion for moving the nose portion the full distance between the two positions;

the internal portion of said fuselage vacated by said nose portion in the extended position comprising a forward fuel tank;

and filling means communicating with said forward fuel tank, said filling means having an external connection for coupling to a source of fuel.

2. A drone aircraft according to claim 1, wherein said fuselage has a tubular sleeve longitudinally fixed therein, said nose portion having a rearwardly extending support tube axially slidable in said sleeve, said drive means comprising actuating means connected to said tube for extension and retraction of the nose portion.

3. A drone aircraft according to claim 2, wherein said forward fuel tank has a flexible fuel containing bladder therein, said bladder being folded in the retracted position of the nose portion and being connected to the nose portion to extend therewith.

4. A drone aircraft according to claim 3, wherein said fuselage has an aft fuel tank, said sleeve forming a fuel conducting connection between said fuel tanks.

5. A drone aircraft according to claim 4, wherein said filling means is in said aft fuel tank.

* * * * *